United States Patent
Ogura et al.

(10) Patent No.: US 9,631,926 B2
(45) Date of Patent: Apr. 25, 2017

(54) VIBRATION ELEMENT, VIBRATOR, VIBRATION DEVICE, ELECTRONIC DEVICE AND MOVING OBJECT

(71) Applicant: Seiko Epson Corporation, Tokyo (JP)

(72) Inventors: Seiichiro Ogura, Minowa (JP); Keiichi Yamaguchi, Ina (JP); Ryuta Nishizawa, Matsumoto (JP); Takayuki Kikuchi, Chino (JP)

(73) Assignee: Seiko Epson Corporation (JP)

( * ) Notice: Subject to any disclaimer, the term of this patent is extended or adjusted under 35 U.S.C. 154(b) by 235 days.

(21) Appl. No.: 14/560,402

(22) Filed: Dec. 4, 2014

(65) Prior Publication Data

US 2015/0162522 A1   Jun. 11, 2015

(30) Foreign Application Priority Data

Dec. 5, 2013   (JP) .................................. 2013-251780

(51) Int. Cl.
| | | |
|---|---|---|
| *G01C 19/56* | (2012.01) | |
| *G01C 19/5621* | (2012.01) | |
| *G01C 19/5607* | (2012.01) | |

(52) U.S. Cl.
CPC ..... *G01C 19/5621* (2013.01); *G01C 19/5607* (2013.01)

(58) Field of Classification Search
CPC .................................................. G01C 19/5607
USPC .............. 73/516.12, 514.14, 514.15, 514.16
See application file for complete search history.

(56) References Cited

U.S. PATENT DOCUMENTS

| | | | | |
|---|---|---|---|---|
| 6,765,160 | B1* | 7/2004 | Robinson | H01H 35/14 200/61.45 R |
| 7,210,350 | B2* | 5/2007 | Ogura | G01C 19/5607 73/504.12 |
| 7,412,885 | B2 | 8/2008 | Ogura | |
| 9,013,093 | B2* | 4/2015 | Yamaguchi | H01L 41/053 310/348 |
| 2006/0162447 | A1* | 7/2006 | Ogura | G01C 19/5607 73/504.12 |
| 2009/0126488 | A1* | 5/2009 | Fujimoto | H03H 9/21 73/504.16 |
| 2010/0296147 | A1* | 11/2010 | Terada | B41J 2/471 359/224.1 |
| 2012/0320439 | A1* | 12/2012 | Hiraoka | G02B 26/0833 359/214.1 |
| 2013/0127301 | A1* | 5/2013 | Osawa | H01L 41/09 310/366 |
| 2013/0271804 | A1* | 10/2013 | Horie | G02B 26/0858 359/199.4 |

(Continued)

FOREIGN PATENT DOCUMENTS

| | | |
|---|---|---|
| JP | 2006-201011 A | 8/2006 |
| JP | 2006-201053 A | 8/2006 |
| JP | 2009-074996 A | 4/2009 |

*Primary Examiner* — J. San Martin
(74) *Attorney, Agent, or Firm* — Harness, Dickey & Pierce, P.L.C.

(57) ABSTRACT

A vibration element includes a vibrating portion, a support portion that supports the vibrating portion, and a suspension arm that couples the vibrating portion to the support portion. In addition, the suspension arm includes a meandering portion extending out the support portion and an inclination portion that couples the meandering portion to the vibrating portion.

11 Claims, 15 Drawing Sheets

(56) References Cited

U.S. PATENT DOCUMENTS

| | | | |
|---|---|---|---|
| 2014/0020503 A1* | 1/2014 | Yamaguchi | G01P 9/04 |
| | | | 74/5 R |
| 2014/0077664 A1* | 3/2014 | Ogura | G01C 19/5712 |
| | | | 310/370 |
| 2016/0116285 A1* | 4/2016 | Ogura | G01C 19/5705 |
| | | | 73/504.12 |

* cited by examiner

VIBRATION ELEMENT, VIBRATOR, VIBRATION DEVICE, ELECTRONIC DEVICE AND MOVING OBJECT

BACKGROUND

1. Technical Field

The present invention relates to a vibration element, a vibrator, a vibration device, an electronic device and a moving object.

2. Related Art

Hitherto, as a vibration element for detecting an angular velocity, a vibration element disclosed in JP-A-2006-201011 has been known. The vibration element disclosed in JP-A-2006-201011 includes a basal portion, first and second detection arms extending out from the basal portion along both sides in a Y-axis direction, first and second coupling arms extending out from the basal portion to both sides in an X-axis direction, first and second drive arms extending out from the first coupling arm to both sides in the Y-axis direction, and third and fourth drive arms extending out from the second coupling arm to both sides in the Y-axis direction. In the vibration element having such a configuration, when an angular velocity around an Z-axis is applied in a state where each drive arm is vibrated in a drive mode, vibration in a detection mode is excited in the first and second detection arms, and thus an angular velocity can be detected from a signal which is obtained by the vibration in the detection mode.

Further, the vibration element disclosed in JP-A-2006-201011 includes a support portion that supports the basal portion, and four beams (suspension arms) that couples the basal portion to the support portion, and is configured such that each of the beams is inclined with respect to the X-axis direction and the Y-axis direction and extends out linearly (also see JP-A-2006-201053 and JP-A-2009-74996).

In the vibration element having such a configuration, the concentration of stress on a boundary portion between the basal portion and the beam is reduced, and thus it is possible to improve mechanical strength (impact resistance) in the boundary portion. However, since each beam is formed in a linear shape, a sufficient length is not able to be secured, and thus it is difficult to sufficiently absorb and relax an impact in each beam. As a result, the vibration element disclosed in JP-A-2006-201011, JP-A-2006-201053, and JP-A-2009-74996 has a problem in that mechanical strength (particularly, impact resistance at the time of falling) is not sufficient.

SUMMARY

An advantage of some aspects of the invention is to provide a vibration element, a vibrator, an electronic device and a moving object having excellent mechanical strength (impact resistance).

The invention can be implemented as the following forms or application examples.

Application Example 1

This application example is directed to a vibration element including a basal portion, a support portion that supports the basal portion, a suspension arm that couples the basal portion to the support portion, a support arm that extends out in an X-axis direction from the basal portion, a detection arm that extends out in a Y-axis direction intersect with the X-axis direction from the basal portion, and a drive arm that extends out in the Y-axis direction from a tip portion of the support arm, wherein the suspension arm includes a meandering portion that extend from the support portion and alternately extend in the X-axis direction and the Y-axis direction, and an inclination portion that couples the meandering portion to the basal portion, and extends in a direction inclined with respect to both the X-axis direction and the Y-axis direction.

With this configuration, a vibration element having excellent mechanical strength (impact resistance) is obtained.

Application Example 2

In the vibration element according to the application example described above, it is preferable that the inclination portion includes a plurality of portions having different angles with respect to the X-axis direction.

With this configuration, it is possible to prevent rigidities in the X-axis direction and the Y-axis direction from being drastically changed in a boundary portion between the inclination portion and the meandering portion. Therefore, the concentration of stress on the boundary portion is also reduced, and thus an improvement in the mechanical strength (impact resistance) of the vibration element can be achieved more reliably.

Application Example 3

In the vibration element according to the application example described above, it is preferable that lengths of the plurality of portions is substantially equal to each other.

With this configuration, even when an impact is applied from the outside (even by an impact at the time of falling), stress is applied almost uniformly to respective portions constituting the inclination portion, and thus it is possible to appropriately prevent the inclination portion from being broken down.

Application Example 4

In the vibration element according to the application example described above, it is preferable that an end of the meandering portion on the inclination portion side extends along a direction parallel to an extending direction of the support arm, and the plurality of portions includes a first portion, located on the basal portion side, which has a first angle with respect to the X-axis direction, and a second portion, located on the meandering portion side, which has a second angle smaller than the first angle with respect to the X-axis direction.

With this configuration, it is possible to prevent rigidities in the X-axis direction and the Y-axis direction from being drastically changed in a boundary portion between the inclination portion and the meandering portion. Therefore, the concentration of stress on the boundary portion is also reduced, and thus an improvement in the mechanical strength (impact resistance) of the vibration element can be achieved more reliably.

Application Example 5

In the vibration element according to the application example described above, it is preferable that the first angle is 50 to 70 degrees.

With this configuration, an effect as described above is exhibited more conspicuously.

Application Example 6

In the vibration element according to the application example described above, it is preferable that the second angle is 20 to 40 degrees.

With this configuration, an effect as described above is exhibited more conspicuously.

Application Example 7

In the vibration element according to the application example described above, it is preferable that the respective portions of the vibration element are obtained by processing one piezoelectric substrate, and a separation distance between the end of the meandering portion and the support portion is 0.8 times or more of a thickness of the piezoelectric substrate.

With this configuration, the lateral side (inside surface of the beam) on the support portion side of the boundary portion between the inclination portion and the meandering portion or the boundary portion between the inclination portion and the basal portion can be formed as a smooth surface, that is, a so-called fin can be effectively prevented from being formed on the inside surface of the beam.

Application Example 8

This application example is directed to a vibrator including the vibration element of the application example described above, and a package having the vibration element stored therein.

With this configuration, a vibrator having high reliability is obtained.

Application Example 9

This application example is directed to an electronic device including the vibration element according to the application example described above.

With this configuration, an electronic device having high reliability is obtained.

Application Example 10

This application example is directed to a moving object including the vibration element according to the application example described above.

With this configuration, a moving object having high reliability is obtained.

BRIEF DESCRIPTION OF THE DRAWINGS

The invention will be described with reference to the accompanying drawings, wherein like numbers reference like elements.

FIG. 7A is a cross-sectional view, and FIG. 7B is a top view.

DESCRIPTION OF EXEMPLARY EMBODIMENTS

Hereinafter, a vibration element, a vibrator, an electronic device and a moving object according to the invention will be described in detail on the basis of embodiments shown in the accompanying drawings.

1. Vibration Element

First Embodiment

First, a vibration element according to a first embodiment of the invention will be described.

Figure 1:
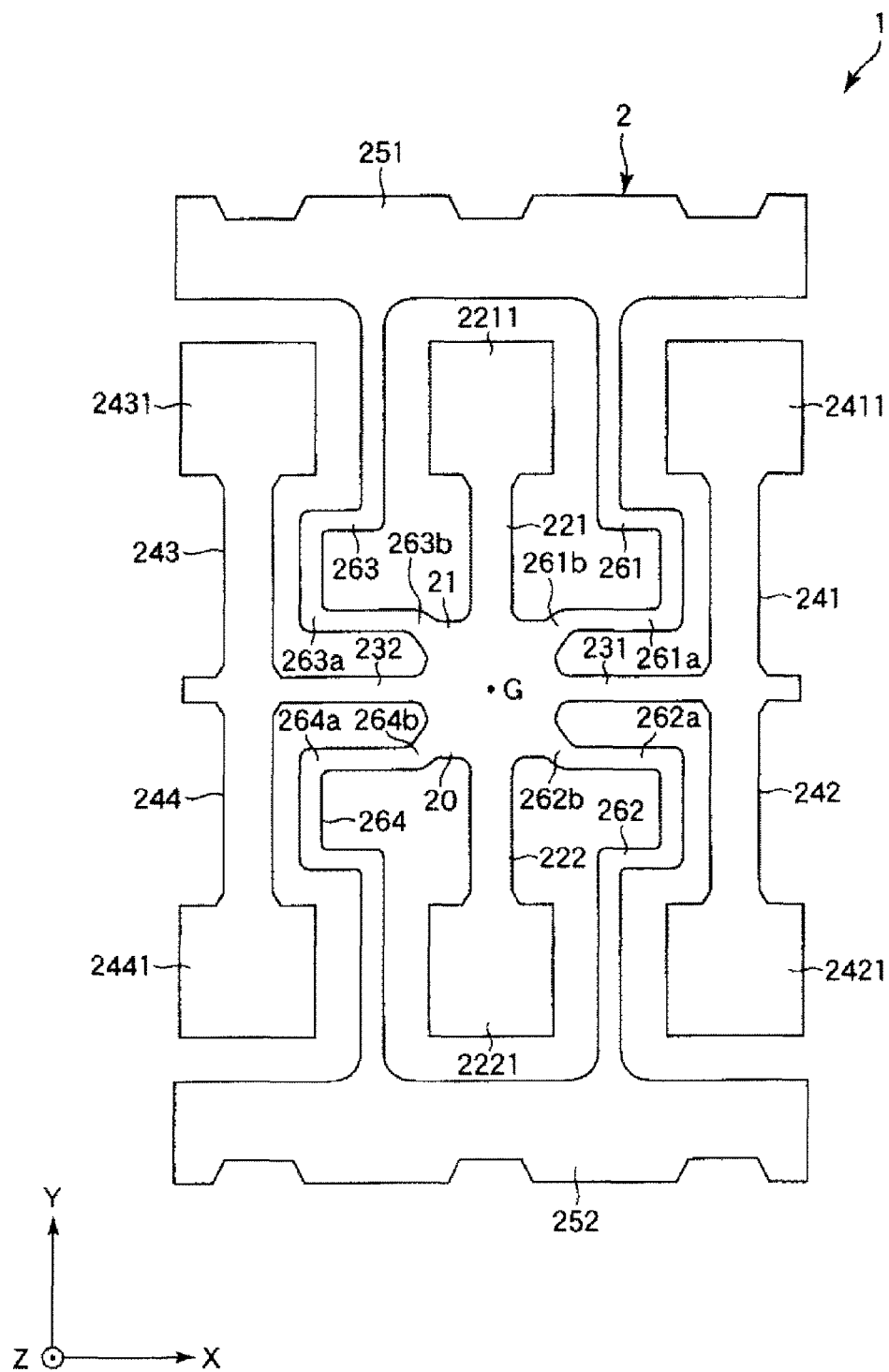
FIG. 1 is a plan view illustrating a vibration element according to a first embodiment of the invention.
Figure 2:
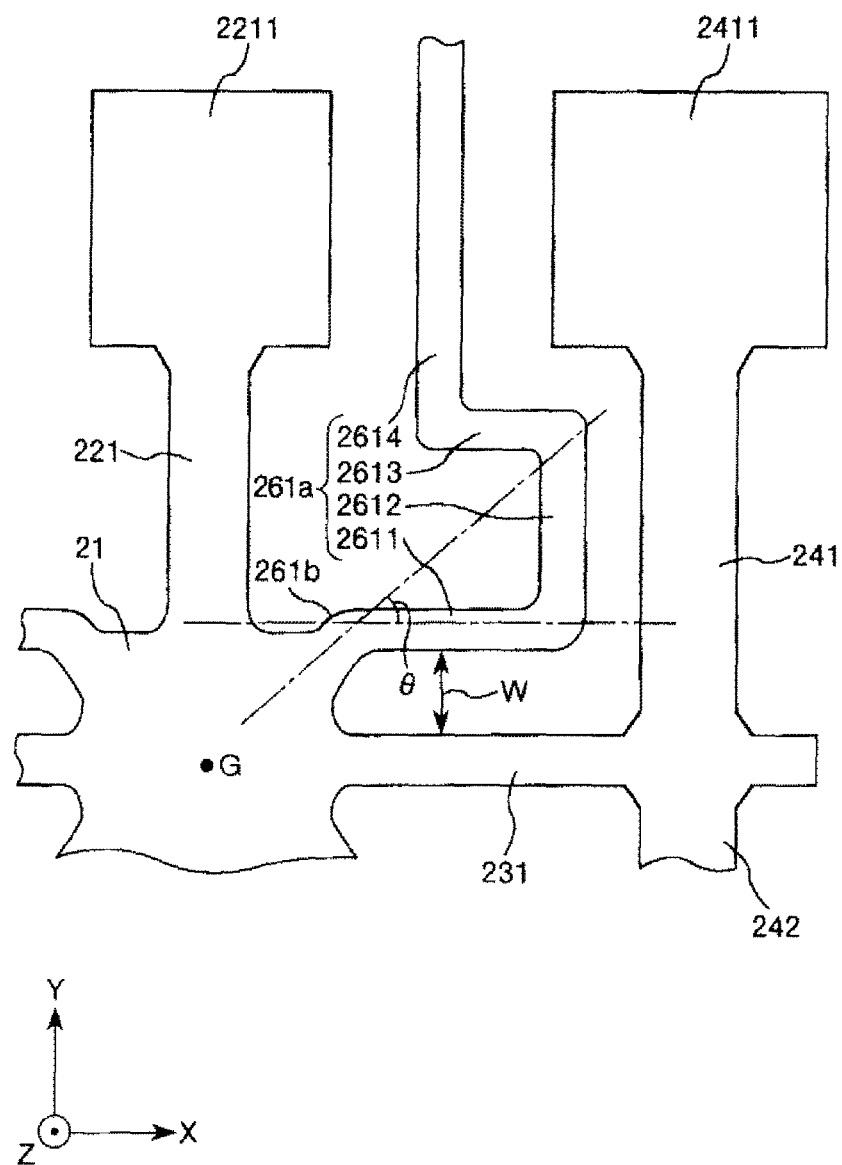
FIG. 2 is an enlarged plan view illustrating the vicinity of the central portion of the vibration element shown in FIG. 1.
Figure 3:
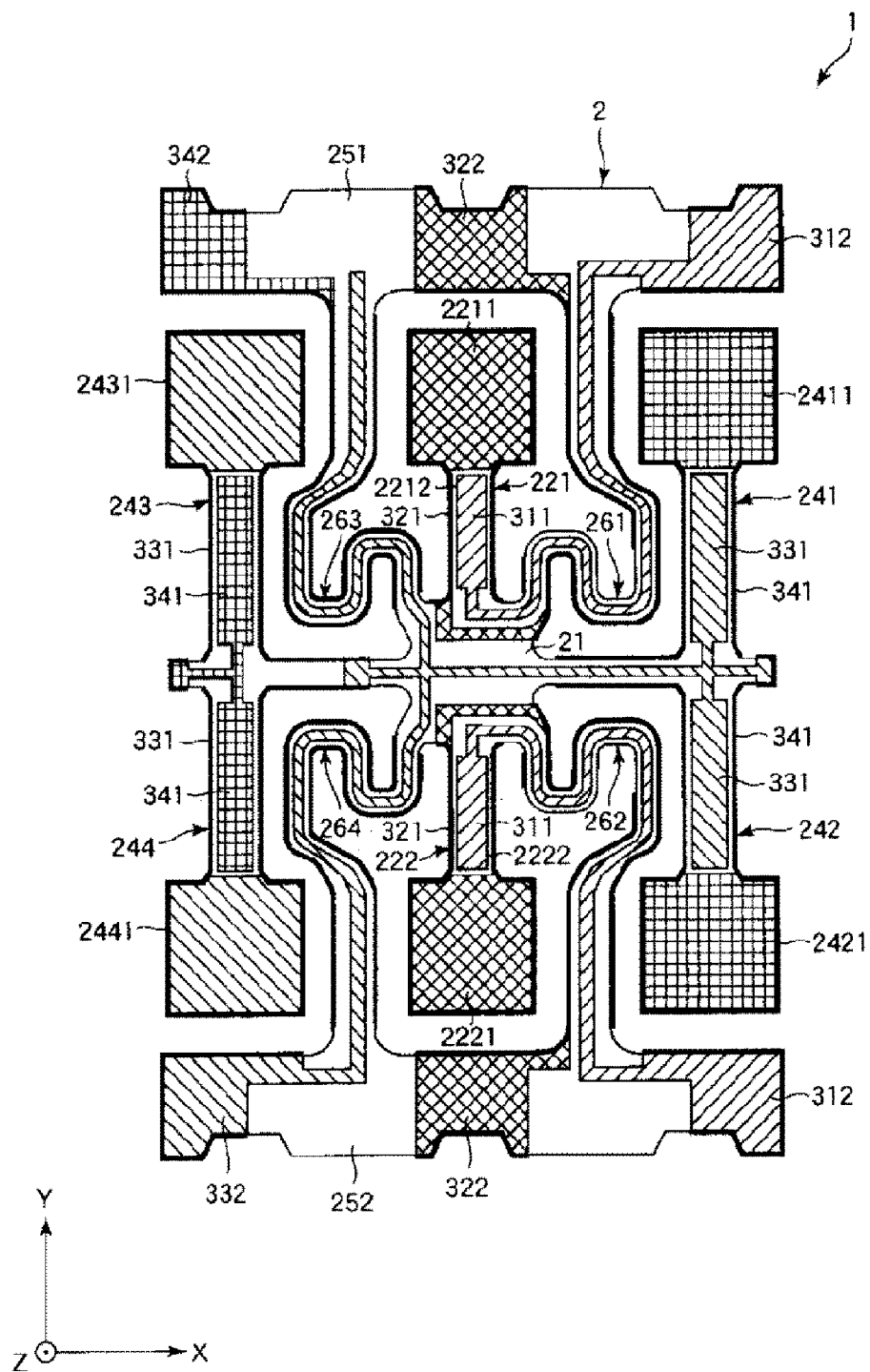
FIG. 3 is a plan view illustrating electrodes included in the vibration element shown in FIG. 1.
Figure 4:
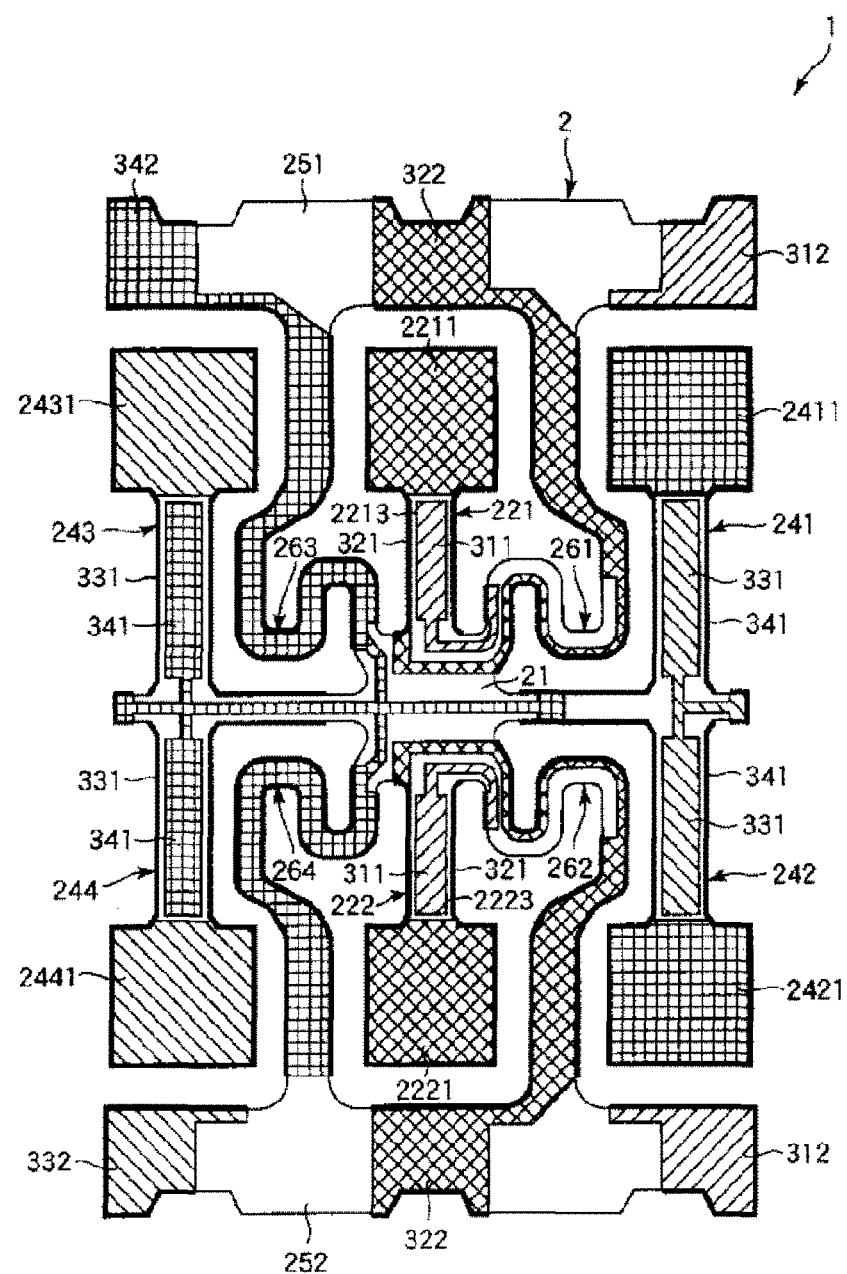
FIG. 4 is a plan view (perspective view) illustrating electrodes included in of the vibration element shown in FIG. 1.
Figure 5A:
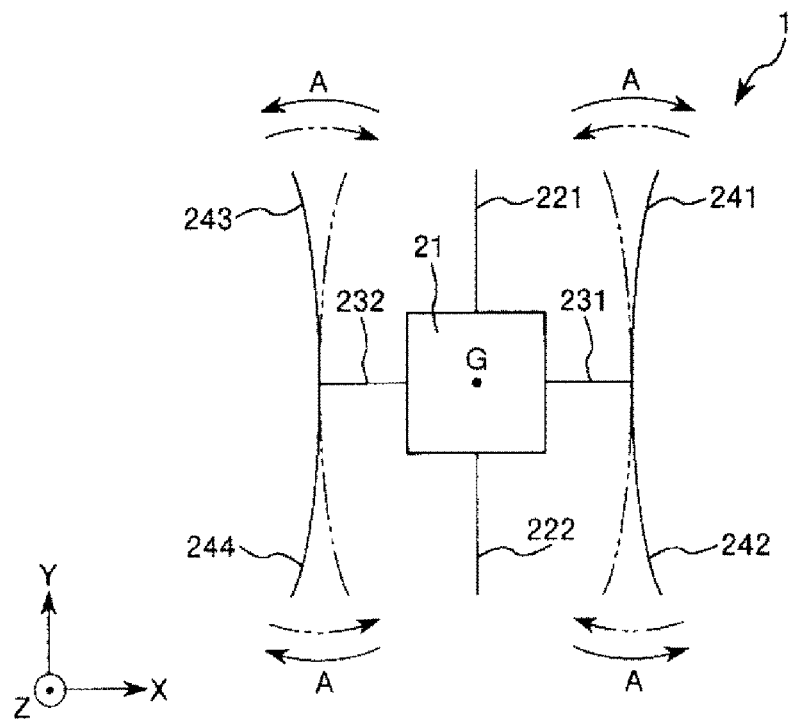
FIGS. 5A and 5B are diagrams illustrating operations of the vibration element shown in FIG. 1.
Figure 5B:
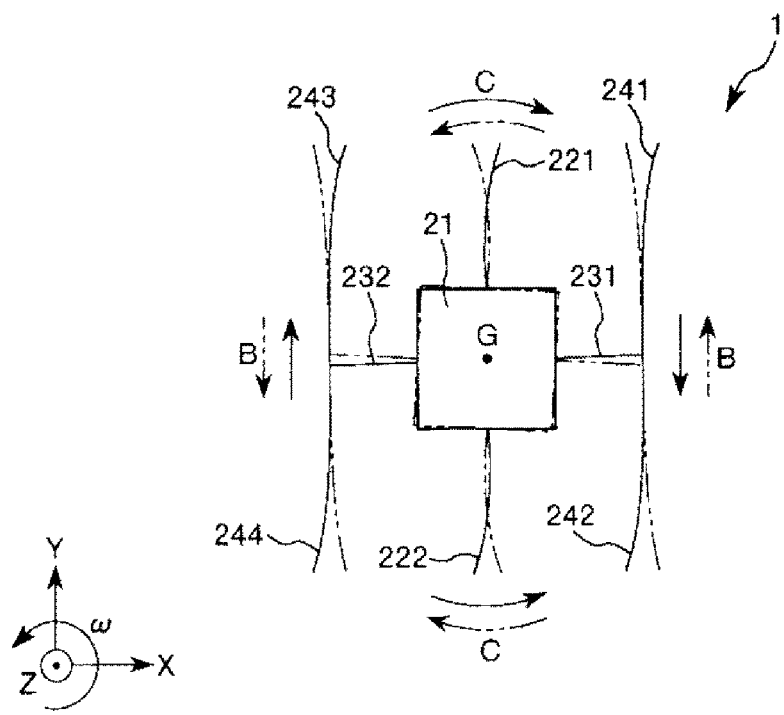

FIG. 1 is a plan view illustrating a vibration element according to the first embodiment of the invention. FIG. 2 is an enlarged plan view illustrating the vicinity of the central portion of the vibration element shown in FIG. 1. FIG. 3 is a plan view illustrating electrodes included in the vibration element shown in FIG. 1. FIG. 4 is a plan view (perspective view) illustrating electrodes included in the vibration element shown in FIG. 1. FIGS. 5A and 5B are diagrams illustrating operations of the vibration element shown in FIG. 1. Meanwhile, hereinafter, for convenience of description, the sheet's front side of FIGS. 1 and 2 is also called an "upper side", and the sheet's deep side is also called a "lower side". In addition, in FIGS. 1, 2 and 6, for convenience of description, the electrodes are not shown.

Basic Structure of Vibration Element

A vibration element 1 shown in FIG. 1 is used as an angular velocity detection element (gyro element). Such a vibration element 1 includes a piezoelectric substrate 2, and electrodes formed on the surface of the piezoelectric substrate 2.

Piezoelectric Substrate

The configuration material of the piezoelectric substrate 2 includes, for example, piezoelectric materials such as a quartz crystal, lithium tantalate, and lithium niobate. Among these materials, it is preferable that a quartz crystal be used as the configuration material of the piezoelectric substrate 2. A quartz crystal is used, thereby allowing the vibration element 1 having more excellent frequency-temperature characteristics than those of other materials to be obtained. Meanwhile, hereinafter, a case in which the piezoelectric substrate 2 is formed of a quartz crystal will be described.

As shown in FIG. 1, the piezoelectric substrate 2 is formed in a plate shape having a width in an XY plane specified by a Y-axis (mechanical axis, second axis) and an X-axis (electrical axis, first axis) which are crystal axes of a quartz crystal substrate, and having a thickness in a Z-axis (optical axis) direction. That is, the piezoelectric substrate 2 is constituted by a Z cut quartz crystal plate. Meanwhile, the Z-axis is preferably coincident with the thickness direction of the piezoelectric substrate 2, but may be slightly (for example, approximately less than 15°) inclined with respect to the thickness direction from the viewpoint of reducing a frequency-temperature change in the vicinity of ordinary temperature.

Such a piezoelectric substrate 2 includes a vibrating portion 20, first and second support portions 251 and 252 which are disposed facing each other in a Y-axis direction with the vibrating portion 20 interposed therebetween, first and third beams (suspension arms) 261 and 263 that couple the first support portion 251 to the vibrating portion 20, and second and fourth beams (suspension arms) 262 and 264 that couple the second support portion 252 to the vibrating portion 20.

In addition, the vibrating portion 20 includes a basal portion 21 located at the central portion, first and second detection arms 221 and 222 extending out from the basal portion 21 to both sides in the Y-axis direction, first and second coupling arms (support arms) 231 and 232 extending from the basal portion 21 to both sides in an X-axis direction, first and second drive arms 241 and 242 extending out from the tip portion of the first coupling arm 231 to both sides in the Y-axis direction, and third and fourth drive arms 243 and 244 extending out from the tip portion of the second coupling arm 232 to both sides in the Y-axis direction, and the basal portion 21 is supported at the first and second support portions 251 and 252 by the beams 261, 262, 263, and 264.

The first detection arm 221 extends out in a +Y-axis direction from the basal portion 21, and the tip portion thereof is provided with a wide hammerhead 2211. On the other hand, the second detection arm 222 extends out in a −Y-axis direction from the basal portion 21, and the tip portion thereof is provided with a wide hammerhead 2221. These first and second detection arms 221 and 222 are disposed in plane-symmetry with respect to an XZ plane through a centroid G of the vibration element 1.

The first and second detection arms 221 and 222 are provided with the hammerheads 2211 and 2221, and thus it is possible to improve the detection sensitivity of an angular velocity, and to shorten the lengths of the first and second detection arms 221 and 222. Meanwhile, the hammerheads 2211 and 2221 may be provided as necessary, and may be omitted. In addition, bottomed grooves extending in a lengthwise direction may be formed, as necessary, in the upper surfaces and the lower surfaces of the first and second detection arms 221 and 222.

The first coupling arm 231 extends out in an +X-axis direction from the basal portion 21. On the other hand, the second coupling arm 232 extends out in an −X-axis direction from the basal portion 21. These first and second coupling arms 231 and 232 are disposed in plane-symmetry with respect to a YZ plane through the centroid G. Meanwhile, the upper surfaces and the lower surfaces of the first and second coupling arms 231 and 232 may be provided with bottomed grooves extending in the length direction (X-axis direction) thereof.

The first drive arm 241 extends out in the +Y-axis direction from the tip portion of the first coupling arm 231, and the tip portion thereof is provided with a wide hammerhead 2411. In addition, the second drive arm 242 extends out in the −Y-axis direction from the tip portion of the first coupling arm 231, and the tip portion thereof is provided with a wide hammerhead 2421. In addition, the third drive arm 243 extends out in the +Y-axis direction from the tip portion of the second coupling arm 232, and the tip portion thereof is provided with a wide hammerhead 2431. In addition, the fourth drive arm 244 extends out in the −Y-axis direction from the tip portion of the second coupling arm 232, and the tip portion thereof is provided with a wide hammerhead 2441. These four drive arms 241, 242, 243, and 244 are disposed in point symmetry with respect to the centroid G.

The drive arms 241, 242, 243, and 244 are provided with the hammerheads 2411, 2421, 2431, and 2441, and thus it is possible to improve the detection sensitivity of an angular velocity, and to shorten the lengths of the drive arms 241, 242, 243, and 244. Meanwhile, the hammerheads 2411, 2421, 2431, and 2441 may be provided as necessary, and may be omitted. In addition, bottomed grooves extending in a lengthwise direction may be formed, as necessary, in the upper surfaces and the lower surfaces of the drive arms 241, 242, 243, and 244.

The first support portion 251 is located at the +Y-axis direction side with respect to the basal portion 21, and is disposed extending in the X-axis direction. On the other hand, the second support portion 252 is located at the −Y-axis direction side with respect to the basal portion 21, and is disposed extending in the X-axis direction. These first and second support portions 251 and 252 are disposed in plane-symmetry with respect to the XZ plane through the centroid G.

The first beam 261 couples the basal portion 21 to the first support portion 251 through between the first detection arm 221 and the first drive arm 241. In addition, the second beam 262 couples the basal portion 21 to the second support portion 252 through between the second detection arm 222 and the second drive arm 242. In addition, the third beam 263 couples the basal portion 21 to the first support portion 251 through between the first detection arm 221 and the third drive arm 243. In addition, the fourth beam 264 couples the basal portion 21 to the second support portion 252 through between the second detection arm 222 and the fourth drive arm 244. These beams 261, 262, 263, and 264 are disposed in point symmetry with respect to the centroid G.

As stated above, the configuration of the piezoelectric substrate 2 has been briefly described.

Next, the configurations of the first to fourth beams 261 to 264 will be described in detail.

As shown in FIG. 1, the first beam 261 includes a meandering portion 261a coupled to the first support portion 251, and an inclination portion 261b that couples the meandering portion 261a to the basal portion 21. The second beam 262 includes a meandering portion 262a coupled to the second support portion 252, and an inclination portion 262b that couples the meandering portion 262a to the basal portion 21. The third beam 263 includes a meandering portion 263a coupled to the first support portion 251, and an inclination portion 263b that couples the meandering portion 263a to the basal portion 21. The second beam 262 includes a meandering portion 264a coupled to the second support portion 252, and an inclination portion 264b that couples the meandering portion 264a to the basal portion 21.

The first beam 261 and the third beam 263, and the second beam 262 and the fourth beam 264 are formed in horizontally symmetric shapes, respectively. The first beam 261 and the second beam 262, and the third beam 263 and the fourth beam 264 are formed in vertically symmetric shapes, respectively. That is, since the configurations of the first to fourth beams 261 to 264 are the same as each other, the configuration of the first beam 261 will be representatively described below, and the configurations of the second to fourth beams 262 to 264 will not be described below.

As shown in FIG. 2, in the first beam 261, the meandering portion 261a is constituted by a first extending portion 2611 extending out in the +X-axis direction from the inclination portion 261b, a second extending portion 2612 extending out in the +Y-axis direction from the tip portion of the first extending portion 2611, a third extending portion 2613 extending out in the −X-axis direction from the tip portion of the second extending portion 2612, and a fourth extending portion 2614 extending out in the +Y-axis direction from the tip portion of the third extending portion 2613 and reaching the first support portion 251. That is, the meandering portion 261a is configured such that the extending portions extending in the X-axis direction and the extending portions extending in the Y-axis direction are alternately disposed. Thereby, the meandering portion 261a has elasticity in the X-axis direction and the Y-axis direction.

Particularly, the first beam 261 is formed in an elongated shape having the meandering portion 261a as a whole, and thus has elasticity in all the directions. Therefore, even when an impact is applied from the outside (even by an impact at the time of falling), impacts in the X-axis direction, the Y-axis direction and the synthetic direction thereof (that is, in-plane direction of the XY plane) can be effectively relaxed and absorbed by the first beam 261 (the same is true of the second to fourth beams 262 to 264). As a result, the vibration element 1 can exhibit an excellent mechanical strength (impact resistance) regardless of the direction of an impact.

Such a meandering portion 261a is coupled to the basal portion 21 through the inclination portion 261b. The inclination portion 261b extends in a synthetic direction (oblique direction) of the +Y-axis direction and the +X-axis direction, that is, a direction which is inclined with respect to both the X-axis direction and the Y-axis direction. Thereby, the concentration of stress on the boundary portion between the basal portion 21 and the inclination portion 261b (first beam 261) is reduced, and thus it is possible to achieve an improvement in the mechanical strength (impact resistance) of the vibration element 1.

In this manner, the first beam 261 (the same is true of the second to fourth beams 262 to 264) includes both the meandering portion 261a and the inclination portion 261b, and thus the vibration element 1 which is particularly excellent in mechanical strength (impact resistance) is obtained.

An angle (angle θ in FIG. 2) between the inclination portion 261b and the X-axis direction is not particularly limited, but is preferably approximately 20 to 70 degrees, and is more preferably approximately 30 to 60 degrees. The angle θ is set to be in the above range, and the shape of the meandering portion 261a is appropriately designed even when the length of the inclination portion 261b is made relatively large. Thereby, it is possible to prevent the total length of the first beam 261 from unnecessarily increasing in length. That is, it is possible to prevent the vibration element 1 from increasing in size.

In addition, the length of the inclination portion 261b is set to be relatively large, thereby the separation distance between the meandering portion 261a and the first coupling arm 231 to be sufficiently secured. Here, the vibrating portion 20, the first and second support portions 251 and 252, and the first to fourth beams 261 to 264 are integrally formed, for example, by processing (particularly, wet-etching) one piezoelectric substrate 2 (quartz crystal substrate). However, when a design is made so as to secure sufficient separation between the meandering portion 261a and the first coupling arm 231, it is possible to cause side etching to proceed sufficiently during the processing of the piezoelectric substrate 2.

As a result, particularly, the lateral side on the first coupling arm 231 side (hereinafter, the lateral side of a corresponding portion is collectively called the "inside surface of the first beam 261") of the boundary portion between the inclination portion 261b and the first extending portion 2611 (end of the meandering portion 261a on the inclination portion 261b side) or the boundary portion between the inclination portion 261b and the basal portion 21 can be formed as a smooth surface, that is, a so-called fin can be prevented effectively from being formed on the inside surface of the first beam 261. Thereby, the vibration element 1 having an intended vibration frequency can be obtained more reliably.

In the present embodiment, although the first extending portion 2611 extends along a direction parallel to the extending direction of the first coupling arm 231, and an angle between the inclination portion 261b and the first extending portion 2611 and an angle between the inclination portion 261b and the right side edge of the basal portion 21 are larger than 90 degrees but becomes slightly smaller than 180 degrees, side etching can be caused to proceed sufficiently as stated above. Therefore, the inside surface of the first beam 261 can be formed as a smooth surface more reliably, that is, a fin can be prevented more effectively from being formed.

The separation distance (distance W in FIG. 2) between the first extending portion 2611 and the first coupling arm 231 is not particularly limited, but is preferably 0.8 times or more the thickness of the piezoelectric substrate 2 (basal portion 21), more preferably approximately 0.85 times to 1.2 times, and still more preferably approximately 0.9 to 1.1 times. Alternatively, the distance W is preferably 1.1 times or more the width of the first coupling arm 231, more preferably approximately 1.3 to 2 times, and still more preferably approximately 1.5 to 2 times. The distance W is set to be equal to or greater than the above lower limit, and thus a fin can be prevented more reliably from being formed on the inside surface of the first beam 261. On the other hand, even when the distance W is made larger by exceeding the above upper limit, a further increase in effect is not able to be expected, and the vibration element 1 has to increase in size, which leads to an undesirable result.

In addition, the length of the inclination portion 261b is also not particularly limited, but is preferably approximately 0.5 to 20% of the total length of the first beam 261, more preferably approximately 1 to 15%, and more preferably approximately 3 to 10%. Thereby, it is possible to achieve an improvement in its mechanical strength (impact resistance) while preventing the vibration element 1 from increasing in size.

Electrode

Electrodes are formed on the surface of the piezoelectric substrate 2.

As shown in FIGS. 3 and 4, the electrodes include detection signal electrodes 311, detection signal terminals 312, detection ground electrodes 321, detection ground terminals 322, drive signal electrodes 331, a drive signal terminal 332, drive ground electrodes 341, and a drive ground terminal 342. Meanwhile, in FIGS. 3 and 4, for convenience of description, the detection signal electrode 311 and the detection signal terminal 312, the detection ground electrode 321 and the detection ground terminal 322, the drive signal electrode 331 and the drive signal terminal 332, and the drive ground electrode 341 and the drive ground terminal 342 are respectively shown by different hatching. In addition, electrodes, wirings, and terminals which are formed on the lateral side of the piezoelectric substrate 2 are shown by heavy lines.

The detection signal electrodes 311 are formed on the upper surfaces and lower surfaces (portions excluding the hammerheads 2211 and 2221) of the first and second detection arms 221 and 222. Such a detection signal electrode 311 is an electrode for detecting charge generated by the detection vibration of the first and second detection arms 221 and 222 when the vibration is excited.

The detection signal terminal 312 are formed on the right ends of the first and second support portions 251 and 252. The detection signal terminal 312 formed at the first support portion 251 is electrically connected to the detection signal electrode 311 formed at the first detection arm 221, through a detection signal wiring formed at the first beam 261. On the other hand, the detection signal terminal 312 formed at the second support portion 252 is electrically connected to the detection signal electrode 311 formed at the second detection arm 222, through a detection signal wiring formed at the second beam 262.

In addition, the detection ground electrodes 321 are formed on both lateral sides of the first and second detection arms 221 and 222. The detection ground electrodes 321 formed on both lateral sides of the first detection arm 221 are electrically connected to each other through the hammerhead 2211, and the detection ground electrodes 321 formed on both lateral sides of the second detection arm 222 are electrically connected to each other through the hammerhead 2221. Such detection ground electrodes 321 have a potential serving as a ground with respect to the detection signal electrodes 311.

The detection ground terminals 322 are formed at the central portions of the first and second support portions 251 and 252.

The detection ground terminal 322 formed at the first support portion 251 is electrically connected to the detection ground electrode 321 formed at the first detection arm 221, through a detection ground wiring formed at the first beam 261. On the other hand, the detection ground terminal 322 formed at the second support portion 252 is electrically connected to the detection ground electrode 321 formed at the second detection arm 222, through a detection ground wiring formed at the second beam 262.

In this manner, by disposing the detection signal electrode 311, the detection signal terminal 312, the detection ground electrode 321, and the detection ground terminal 322, the detection vibration generated in the first detection arm 221 appears charge between the detection signal electrode 311 and the detection ground electrode 321 which are formed at the first detection arm 221, and can be extracted as a signal from the detection signal terminal 312 and the detection ground terminal 322 which are formed at the first support portion 251. In addition, the detection vibration generated in the second detection arm 222 appears as charge between the detection signal electrode 311 and the detection ground electrode 321 which are formed at the second detection arm 222, and can be extracted as a signal from the detection signal terminal 312 and the detection ground terminal 322 which are formed at the second support portion 252.

The drive signal electrodes 331 are formed on the upper surfaces and lower surfaces (portions excluding the hammerheads 2411 and 2421) of the first and second drive arms 241 and 242. Further, the drive signal electrodes 331 are formed on both lateral sides of the third and fourth drive arms 243 and 244. The drive signal electrodes 331 formed on both lateral sides of the third drive arm 243 are electrically connected to each other through the hammerhead 2431, and the drive signal electrodes 331 formed on both lateral sides of the fourth drive arm 244 are electrically connected to each other through the hammerhead 2441. Such drive signal electrodes 331 are electrodes for exciting the drive vibration of the first, second, third, fourth drive arms 241, 242, 243, and 244.

In addition, the drive signal terminal 332 is formed at the left end of the second support portion 252. The drive signal terminal 332 is electrically connected to the drive signal electrodes 331 formed at the first, second, third, fourth drive arms 241, 242, 243, and 244, through a drive signal wiring formed at the fourth beam 264.

The drive ground electrode 341 are formed on the upper surfaces and lower surfaces (portions excluding the hammerheads 2431 and 2441) of the third and fourth drive arms 243 and 244. Further, the drive ground electrodes 341 are formed on both lateral sides of the first and second drive arms 241 and 242. The drive ground electrodes 341 formed on both lateral sides of the first drive arm 241 are electrically connected to each other through the hammerhead 2411, and the drive ground electrodes 341 formed on both lateral sides of the second drive arm 242 are electrically connected to each other through the hammerhead 2421. Such drive ground electrodes 341 have a potential serving as a ground with respect to the drive signal electrodes 331.

In addition, the drive ground terminal 342 is formed at the left end of the first support portion 251. The drive ground terminal 342 is electrically connected to the drive ground electrodes 341 formed at the first, second, third, and fourth drive arms 241, 242, 243, and 244, through a drive ground wiring formed at the third beam 263.

In this manner, the drive signal electrode 331, the drive signal terminal 332, the drive ground electrode 341, and the drive ground terminal 342 are disposed, and a drive signal is applied between the drive signal terminal 332 and the drive ground terminal 342. Thereby, an electric field is generated between the drive signal electrode 331 and the drive ground electrode 341 which are formed at the first, second, third, fourth drive arms 241, 242, 243, and 244, and thus each of the drive arms 241, 242, 243, and 244 can be driven and vibrated.

Such configurations of the electrodes are not particularly limited as long as they have conductivity, and the electrodes can be formed of metal coatings obtained by laminating each coating such as Ni (nickel), Au (gold), Ag (silver), or Cu (copper) on a metallization layer (underlying layer) of, for example, Cr (chrome), W (tungsten) or the like.

Drive of Vibration Element

Next, the drive of the vibration element 1 will be described.

In a state where an angular velocity is not applied to the vibration element 1, when an electric field is generated between the drive signal electrode 331 and the drive ground electrode 341 by applying a voltage (alternating voltage) between the drive signal terminal 332 and the drive ground terminal 342, each of the drive arms 241, 242, 243, and 244 is flexurally vibrated in a direction shown by arrow A, as shown in FIG. 5A. In this case, since the first and second drive arms 241 and 242 and the third and fourth drive arms 243 and 244 are vibrated plane-symmetrically with respect to the YZ plane through the centroid G of the vibration element 1, the basal portion 21, the first and second detection arms 221 and 222, and the first and second coupling arms 231 and 232 are hardly vibrated.

When an angular velocity ω around the Z-axis is applied to the vibration element 1 in a state where this drive vibration is performed, detection vibration as shown in FIG. 5B is excited. Specifically, a Coriolis force in the direction of arrow B acts on the drive arms 241, 242, 243, and 244 and the first and second coupling arms 231 and 232, and new vibration is excited. This vibration in the direction of the arrow B is vibration in a circumferential direction with respect to the centroid G.

Simultaneously, detection vibration in the direction of arrow C is excited in the first and second detection arms 221 and 222, in response to the vibration of arrow B. Charge generated in the first and second detection arms 221 and 222 by this vibration extracted as a signal from the detection signal electrode 311 and the detection ground electrode 321, and an angular velocity is obtained on the basis of this signal.

Second Embodiment

Next, a vibration element according to a second embodiment of the invention will be described.

Figure 6:
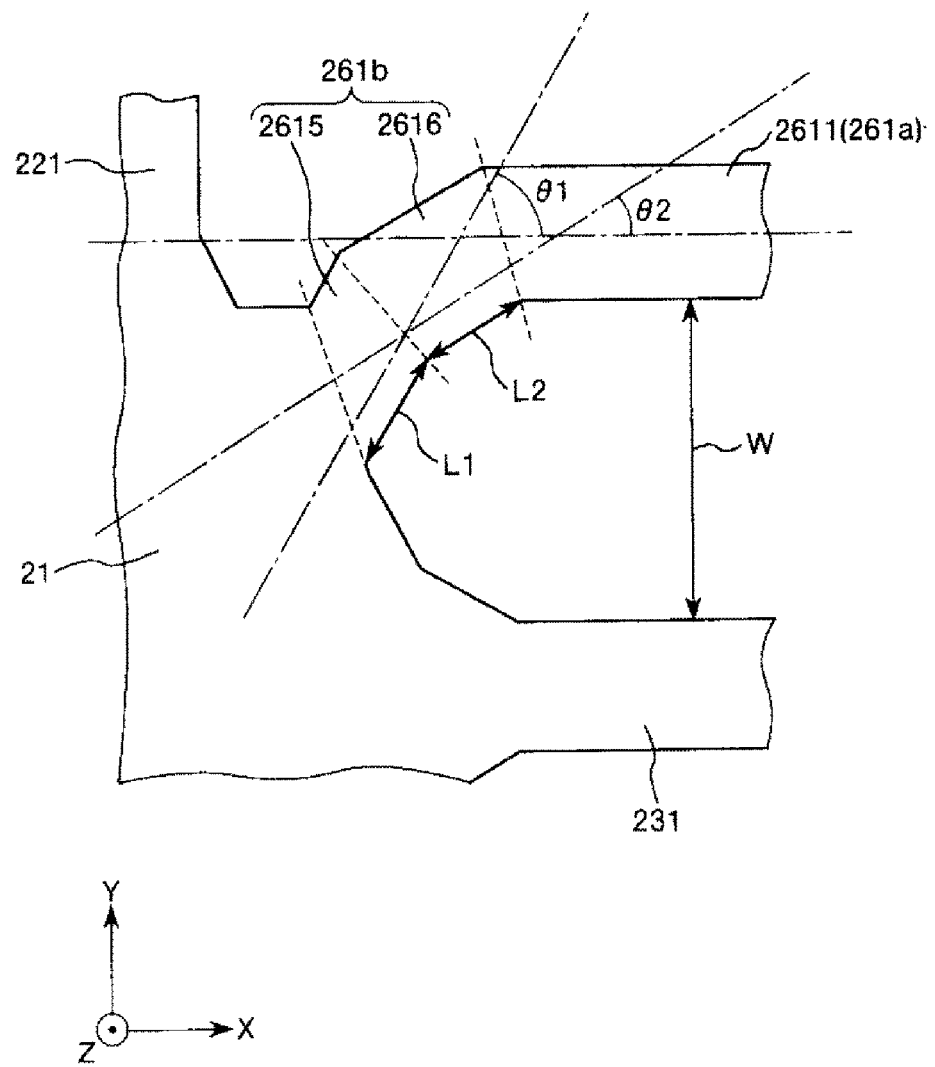
FIG. 6 is an enlarged plan view illustrating the vicinity of the central portion of a vibration element according to a second embodiment of the invention.

FIG. 6 is an enlarged plan view illustrating the vicinity of the central portion of a vibrator according to the second embodiment of the invention. Meanwhile, in FIG. 6, for convenience of description, electrodes are not shown.

Hereinafter, the second embodiment will be described with focus on a difference from the aforementioned embodiment, and the description of the same particulars will not be given below.

The second embodiment is the same as the aforementioned first embodiment, except for different configurations of the inclination portions of the respective beams. Meanwhile, in FIG. 6, the same components as those of the embodiment mentioned above are denoted by the same reference numerals and signs. In addition, since the shapes of the first to fourth beams 261 to 264 are the same as each other, the first beam 261 will be representatively described below, and the description of the second to fourth beams 262 to 264 will not be given below.

As shown in FIG. 6, the inclination portion 261b of the first beam 261 includes a plurality of portions having different angles with respect to the X-axis direction (hereinafter, also simply called "having different angles"). Specifically, the inclination portion 261b is constituted by a first inclination portion (first portion) 2615 located on the basal portion 21 side and a second inclination portion (second portion) 2616 located on the meandering portion 261a (first extending portion 2611) side. In the present embodiment, an angle (second angle θ2 in FIG. 6) between the second inclination portion 2616 and the X-axis direction is set to be smaller than an angle (first angle θ1 in FIG. 6) between the first inclination portion 2615 and the X-axis direction.

In this manner, the inclination portion 261b is constituted by a plurality of portions (two portions in the present embodiment) having different angles, and thus it is possible to prevent rigidities in the X-axis direction and the Y-axis direction in the boundary portion between the inclination portion 261b (second inclination portion 2616) and the meandering portion 261a (first extending portion 2611) from being drastically changed. Therefore, the concentration of stress in the boundary portion is also reduced, and thus an improvement in the mechanical strength (impact resistance) of the vibration element 1 can be achieved more reliably.

In addition, since an angle between the second inclination portion 2616 and the first extending portion 2611 can be brought closer to 180 degrees, the inside surface of the first beam 261 can be formed as a smooth surface more reliably, that is, a fin can be prevented further effectively from being formed. Particularly, such an effect becomes more conspicuous by setting the separation distance (distance W in FIG. 6) between the first extending portion 2611 and the first coupling arm 231 to be similar to that in the first embodiment.

The first angle θ1 between the first inclination portion 2615 and the X-axis direction is not particularly limited, but is preferably approximately 50 to 70 degrees, and is more preferably approximately 55 to 65 degrees. On the other hand, the second angle θ2 between the second inclination portion 2616 and the X-axis direction is also not particularly limited, but is preferably approximately 20 to 40 degrees, and is more preferably approximately 25 to 35 degrees. The first angle θ1 and the second angle θ2 are set to be in the above range, and thus the effect as described above is exhibited more conspicuously.

In addition, it is preferable that a first length (length L1 of the surface on the first coupling arm 231 side in FIG. 6) of the first inclination portion 2615 and a second length (length L2 of the surface on the first coupling arm 231 side in FIG. 6) of the second inclination portion 2616 be substantially equal to each other. Specifically, L1/L2 is preferably approximately 0.9 to 1.1, and is more preferably approximately 0.95 to 1.05. Thereby, even when an impact is applied from the outside (even by an impact at the time of falling), stress is applied almost uniformly to the first inclination portion 2615 and the second inclination portion 2616, and stress is applied particularly uniformly to the surface between the first inclination portion 2615 and the second inclination portion 2616 on the first coupling arm 231 side. Thereby, it is possible to appropriately prevent the inclination portion 261b (first beam 261) from being broken down.

In the present embodiment, the inclination portion 261b is constituted by two portions having different angles between the first inclination portion 2615 and the second inclination portion 2616, but the inclination portion 261b may have a portion, provided with an angle between the first angle θ1 and the second angle θ2, between the first inclination portion 2615 and the second inclination portion 2616, may have a portion, provided with an angle larger than the first angle θ1, between the first inclination portion 2615 and the basal portion 21, and may have a portion, provided with an angle smaller than the second angle θ2, between the second inclination portion 2616 and the meandering portion 261a (first extending portion 2611).

Meanwhile, even in this case, it is preferable that the lengths of the respective portions constituting the inclination portion 261b be set to be substantially equal to each other.

Thereby, even when an impact is applied from the outside, stress can be applied almost uniformly to the respective portions constituting the inclination portion 261b.

In addition, when the first extending portion 2611 of the meandering portion 261a is formed extending out in the +Y-axis direction from the inclination portion 261b, it is preferable that in the inclination portion 261b, the first angle θ1 of the first inclination portion 2615 be designed so as to become smaller than the second angle θ2 of the second inclination portion 2616.

2. Vibrator

Next, a vibrator 10 using the vibration element 1 will be described.

Figure 7A:
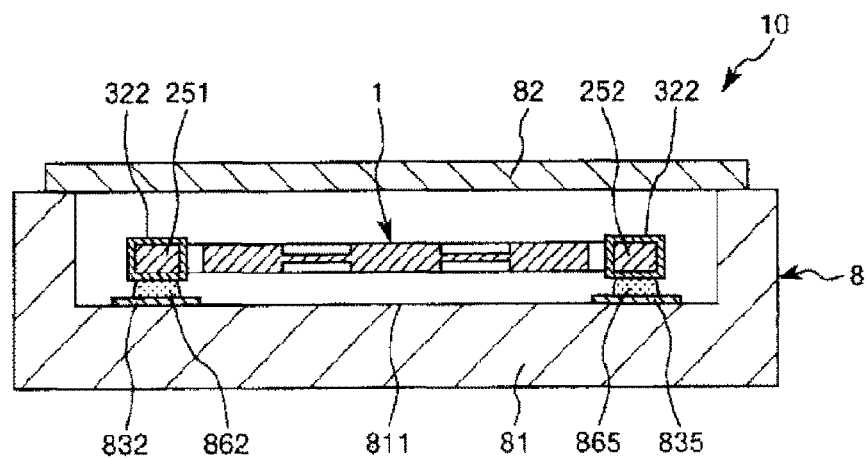
FIGS. 7A and 7B are diagrams illustrating a preferred embodiment of a vibrator according to the invention.
Figure 7B:
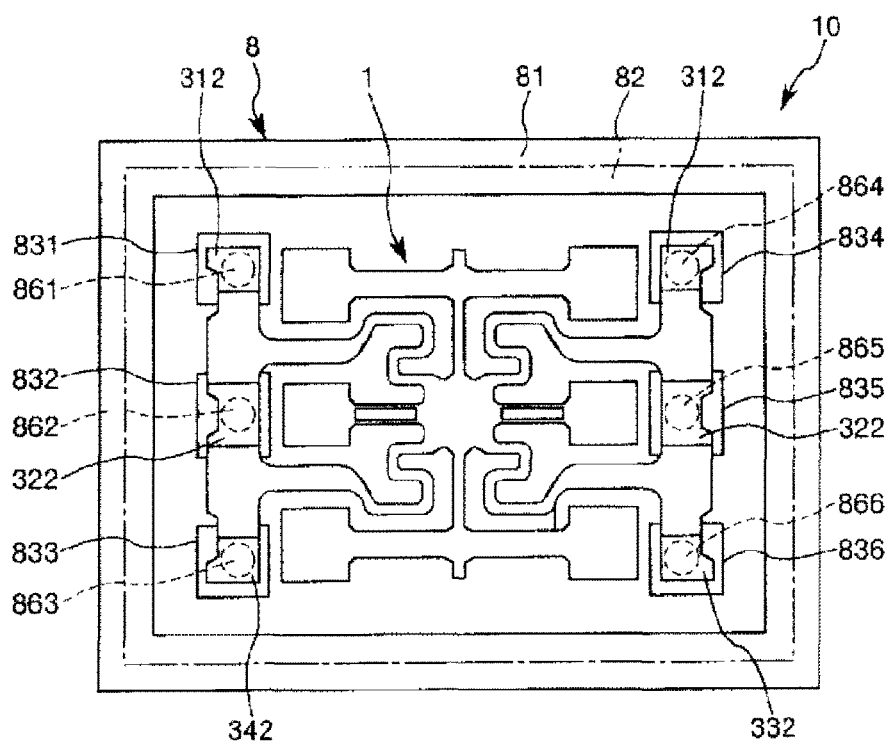

FIGS. 7A and 7B are diagrams illustrating a preferred embodiment of the vibrator according to the invention; FIG. 7A is a cross-sectional view, and FIG. 7B is a top view.

As shown in FIGS. 7A and 7B, the vibrator 10 includes the vibration element 1 and a package 8 that houses the vibration element 1.

The package 8 includes a box-like base 81 having a concave portion 811, and a plate-like lid 82 which is bonded to the base 81 by blocking an opening of the concave portion 811. The vibration element 1 is stored in a housing space formed by the concave portion 811 being blocked by the lid 82. The housing space may be in a decompression (vacuum) state, and may have an inert gas such as nitrogen, helium, or argon sealed therein.

The configuration material of the base 81 is not particularly limited, but various types of ceramics such as an aluminum oxide, or various glass materials can be used as the material. In addition, the configuration material of the lid 82 is not particularly limited, but a member having a linear expansion coefficient approximate to that of the configuration material of the base 81 may be used as the material. For example, when ceramics as described above are used as the configuration material of the base 81, it is preferable to use an alloy such as Kovar. Meanwhile, a method of bonding the base 81 to the lid 82 is not particularly limited, and the bonding can be performed through, for example, an adhesive or a brazing filler metal.

Connection terminals 831, 832, 833, 834, 835, and 836 are formed at the bottom of the concave portion 811. Each of these connection terminals 831 to 836 is extracted to the lower surface (outer circumferential surface of the package 8) of the base 81 by a through-electrode or the like (not shown) formed at the base 81. The configurations of the connection terminals 831 to 836 are not particularly limited as long as they have conductivity, and the electrodes can be formed of metal coatings obtained by laminating each coating such as Ni (nickel), Au (gold), Ag (silver), or Cu (copper) on a metallization layer (underlying layer) of, for example, Cr (chrome), W (tungsten) or the like.

The vibration element 1 is configured such that the first support portion 251 is fixed to the bottom of the concave portion 811 by conductive adhesives 861, 862, and 863, and that the second support portion 252 is fixed to the bottom of the concave portion 811 by conductive adhesives 864, 865, and 866. In addition, one detection signal terminal 312 and the connection terminal 831 are electrically connected to each other by the conductive adhesive 861, one detection ground terminal 322 and the connection terminal 832 are electrically connected to each other by the conductive adhesive 862, the drive ground terminal 342 and the connection terminal 833 are electrically connected to each other by the conductive adhesive 863, the other detection signal terminal 312 and the connection terminal 834 are electrically connected to each other by the conductive adhesive 864, the other detection ground terminal 322 and the connection terminal 835 are electrically connected to each other by the conductive adhesive 865, and the drive signal terminal 332 and the connection terminal 836 are electrically connected to each other by the conductive adhesive 866.

The conductive adhesives 861 to 866 are not particularly limited as long as these adhesives have conductivity and adhesiveness, and an adhesive obtained by dispersing a conductive filler such as a silver particle into, for example, a silicon-base adhesive, an epoxy-based adhesive, an acrylic-based adhesive, a polyimide-based adhesive, or a bismaleimide-based adhesive can be used as the conductive adhesives.

3. Physical Quantity Sensor

Next, a physical quantity sensor 100 using the vibration element 1 will be described.

Figure 8:
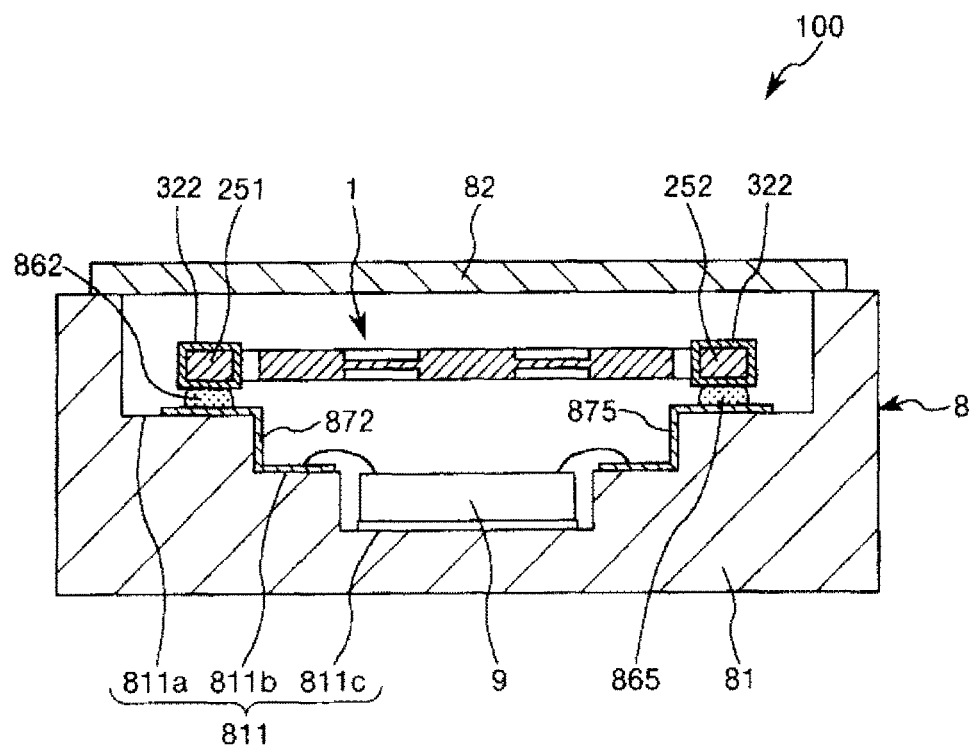
FIG. 8 is a cross-sectional view illustrating a preferred embodiment of a physical quantity sensor including the vibration element according to the invention.
Figure 9:
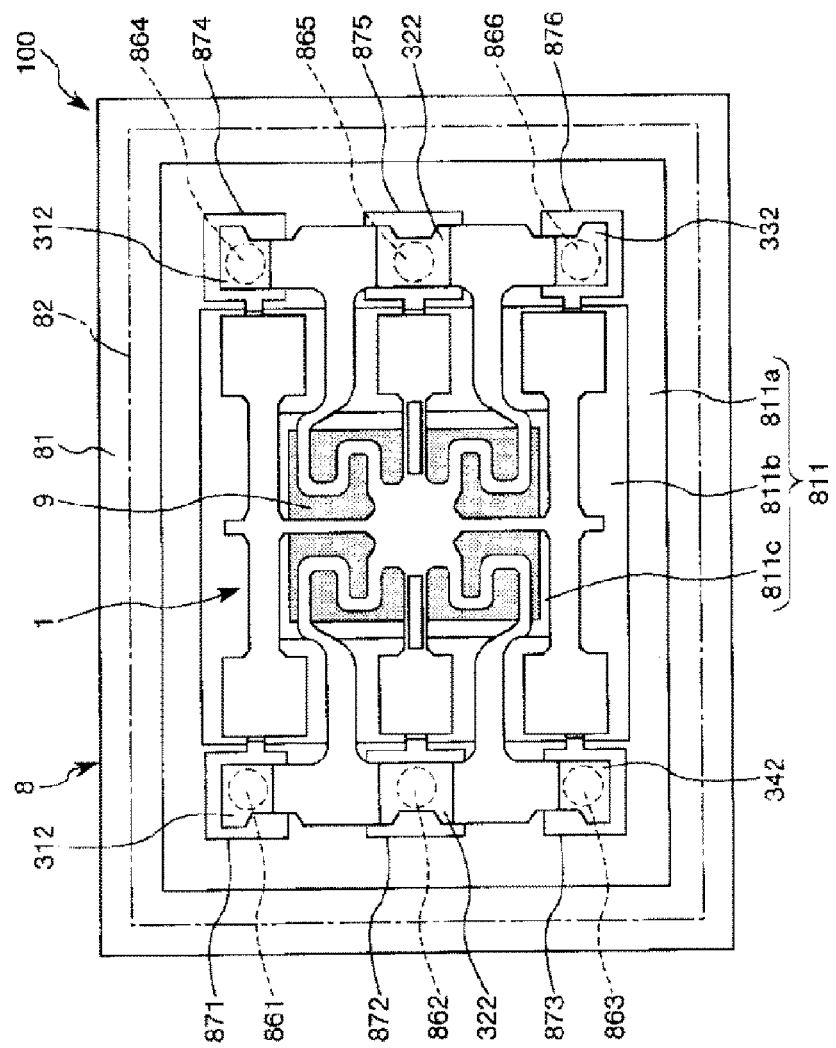
FIG. 9 is a top view illustrating the physical quantity sensor shown in FIG. 8.
Figure 10:
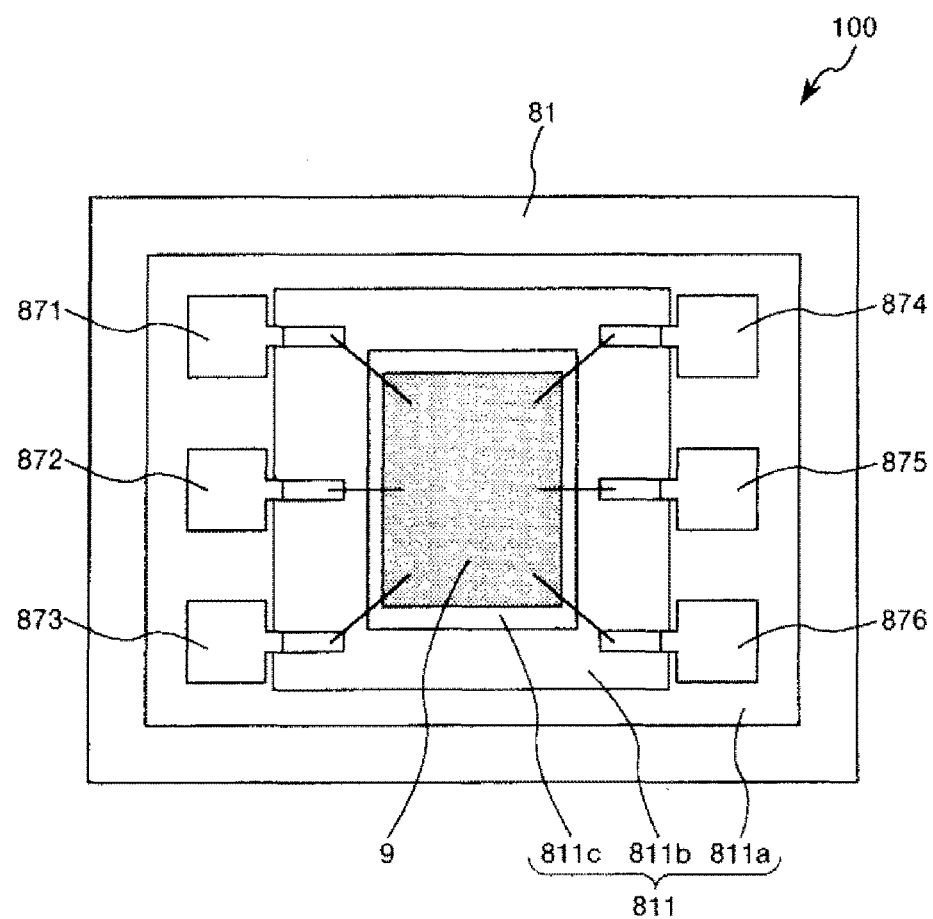
FIG. 10 is a top view illustrating the physical quantity sensor shown in FIG. 8.

FIG. 8 is a cross-sectional view illustrating a preferred embodiment of a physical quantity sensor including the vibration element according to the invention. FIGS. 9 and 10 are top views illustrating the physical quantity sensor shown in FIG. 8. Meanwhile, in FIG. 16, for convenience of description, the lid and the vibration element are not shown.

As shown in FIGS. 8, 9 and 10, the physical quantity sensor 100 includes the vibration element 1, the package 8 that houses the vibration element 1, and an IC chip 9.

As shown in FIG. 8, the package 8 includes the box-like base 81 having the concave portion 811, and the plate-like lid 82 which is bonded to the base 81 by blocking an opening of the concave portion 811. The vibration element 1 and IC chip 9 are stored in a housing space formed by the concave portion 811 being blocked by the lid 82. The housing space may be in a decompression (vacuum) state, and may have an inert gas such as nitrogen, helium, or argon sealed therein.

The concave portion 811 includes a first concave portion 811a opened in the upper surface of the base 81, a second concave portion 811b opened in the central portion of the bottom of the first concave portion 811a, and a third concave portion 811c opened in the central portion of the bottom of the second concave portion 811b. Connection wirings 871, 872, 873, 874, 875, and 876 are formed from the bottom of the first concave portion 811a across the bottom of the second concave portion 811b.

As shown in FIG. 9, the vibration element 1 is configured such that the first support portion 251 is fixed to the bottom of the first concave portion 811a by the conductive adhesives 861, 862, and 863, and that the second support portion 252 is fixed to the bottom of the first concave portion 811a by the conductive adhesives 864, 865, and 866. One detection signal terminal 312 and the connection wiring 871 are electrically connected to each other by the conductive adhesive 861, one detection ground terminal 322 and the connection wiring 872 are electrically connected to each other by the conductive adhesive 862, the drive ground terminal 342 and the connection wiring 873 are electrically connected to each other by the conductive adhesive 863, the other detection signal terminal 312 and the connection wiring 874 are electrically connected to each other by the conductive adhesive 864, the other detection ground terminal 322 and the connection wiring 875 are electrically connected to each other by the conductive adhesive 865, and the drive signal terminal 332 and the connection wiring 876 are electrically connected to each other by the conductive adhesive 866.

As shown in FIG. 10, the IC chip 9 is fixed to the bottom of the third concave portion 811c by a brazing filler metal or the like. The IC chip 9 is electrically connected to each of the connection wirings 871, 872, 873, 874, 875, and 876 by a conductive wire. Thereby, two detection signal terminals 312, two detection ground terminals 322, the drive signal terminal 332, and the drive ground terminal 342 are electrically connected to the IC chip 9. The IC chip 9 includes a drive circuit for driving a vibrating the vibration element 1, and a detection circuit that detects detection vibration generated in the vibration element 1 when an angular velocity is applied.

Meanwhile, in the present embodiment, the IC chip 9 is provided inside the package 8, but the IC chip 9 may be provided outside the package 8.

4. Physical Quantity Detection Device

Next, a physical quantity detection device 1000 using the vibration element 1 will be described.

Figure 11:
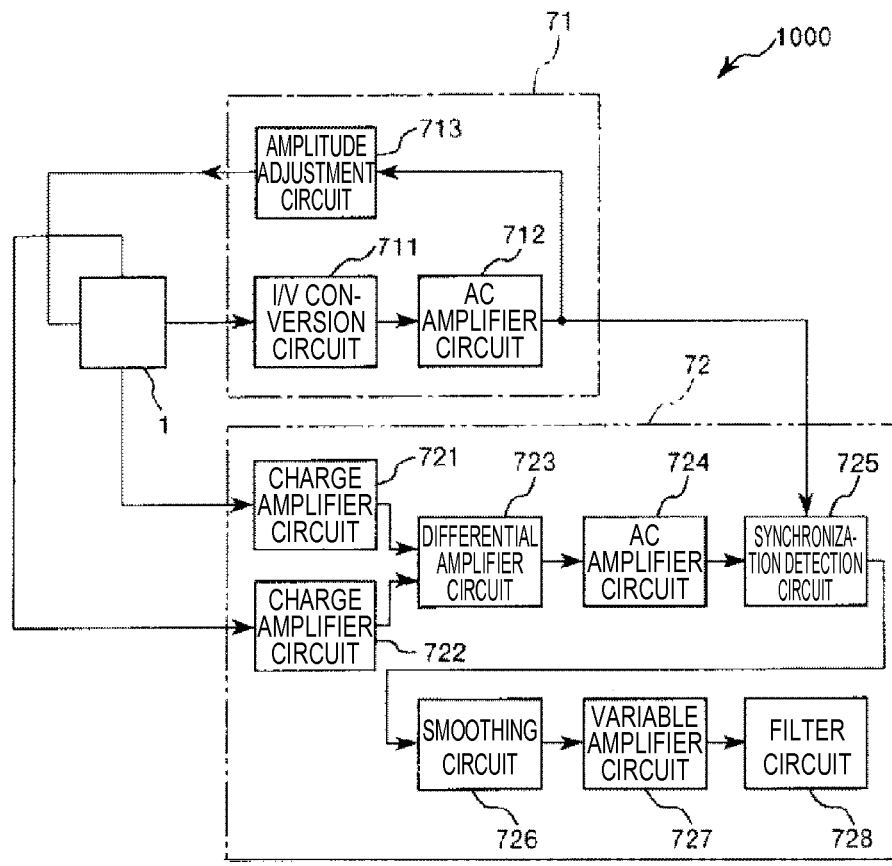
FIG. 11 is a block diagram illustrating a physical quantity detection device including the vibration element according to the invention.

FIG. 11 is a block diagram illustrating a physical quantity detection device including the vibration element according to the invention.

As shown in FIG. 11, the physical quantity detection device 1000 includes the vibration element 1, a drive circuit 71, and a detection circuit 72. The drive circuit 71 and the detection circuit 72 can be incorporated into, for example, the IC chip 9 as described above.

The drive circuit 71 functions as a drive circuit, and includes an I/V conversion circuit (current-voltage conversion circuit) 711, an AC amplifier circuit 712, and an amplitude adjustment circuit 713. Such a drive circuit 71 is a circuit for supplying a drive signal to the drive signal electrode 331 formed in the vibration element 1.

When the vibration element 1 is vibrated, an alternating current based on a piezoelectric effect is output from the drive signal electrode 331 formed in the vibration element 1, and is input to the I/V conversion circuit 711 through the drive signal terminal 332. The I/V conversion circuit 711 converts the input alternating current into an alternating-current voltage signal having the same frequency as the vibration frequency of the vibration element 1 and outputs the converted signal. The alternating-current voltage signal which is output from the I/V conversion circuit 711 is input to the AC amplifier circuit 712, and the AC amplifier circuit 712 amplifies the input alternating-current voltage signal and outputs the amplified signal.

The alternating-current voltage signal which is output from the AC amplifier circuit 712 is input to the amplitude adjustment circuit 713. The amplitude adjustment circuit 713 controls a gain so as to hold the amplitude of the input alternating-current voltage signal to a constant value, the alternating-current voltage signal after the gain control is output to the drive signal electrode 331 through the drive signal terminal 332 formed in the vibration element 1. The vibration element 1 is vibrated by the alternating-current voltage signal (drive signal) which is input to the drive signal electrode 331.

The detection circuit 72 functions as a detection circuit, and includes charge amplifier circuits 721 and 722, a differential amplifier circuit 723, an AC amplifier circuit 724, a synchronization detection circuit 725, a smoothing circuit 726, a variable amplifier circuit 727, and a filter circuit 728. The detection circuit 72 is a circuit that generates a differential amplification signal by differentially amplifying a first detection signal generated in the detection signal electrode 311 formed at the first detection arm 221 of the vibration element 1 and a second detection signal generated in the detection signal electrode 311 formed at the second detection arm 222, and detects a predetermined physical quantity on the basis of the differential amplification signal.

Detection signals (alternating currents) having opposite phases to each other which are detected by the detection signal electrode 311 formed at the first and second detection arms 221 and 222 of the vibration element 1 are input to the charge amplifier circuits 721 and 722 through the detection signal terminal 312. For example, the first detection signal which is detected by the detection signal electrode 311 formed at the first detection arm 221 is input to the charge amplifier circuit 721, and the second detection signal which is detected by the detection signal electrode 311 formed at the second detection arm 222 is input to the charge amplifier circuit 722. The charge amplifier circuits 721 and 722 convert the input detection signals (alternating currents) into alternating-current voltage signals based on a reference voltage Vref.

The differential amplifier circuit 723 generates a differential amplification signal by differentially amplifying an output signal of the charge amplifier circuit 721 and an output signal of the charge amplifier circuit 722. The output signal (differential amplification signal) of the differential amplifier circuit 723 is further amplified by the AC amplifier circuit 724. The synchronization detection circuit 725 functions as a detection circuit, and extracts an angular velocity component by synchronously detecting an output signal of the AC amplifier circuit 724 on the basis of the alternating-current voltage signal which is output by the AC amplifier circuit 712 of the drive circuit 71.

The signal of the angular velocity component which is extracted by the synchronization detection circuit 725 is smoothed to a direct-current voltage signal by the smoothing circuit 726, and is input to the variable amplifier circuit 727. The variable amplifier circuit 727 changes angular velocity sensitivity by amplifying (or attenuating) the output signal (direct-current voltage signal) of the smoothing circuit 726 at an amplification factor (or attenuation factor) which is set. The signal which is amplified (or attenuated) by the variable amplifier circuit 727 is input to the filter circuit 728.

The filter circuit 728 removes a high-frequency noise component from the output signal of the variable amplifier circuit 727 (to be exact, attenuates the component to a predetermined level or less), and generates a detection signal having a polarity and a voltage level depending on the direction and magnitude of an angular velocity. This detection signal is output from an external output terminal (not shown) to the outside.

According to such a physical quantity detection device 1000, as described above, it is possible to generate a differential amplification signal by differentially amplifying the first detection signal which is generated in the detection signal electrode 311 formed at the first detection arm 221 and the second detection signal which is generated in the detection signal electrode 311 formed at the second detection arm 222, and to detect a predetermined physical quantity on the basis of the differential amplification signal.

5. Electronic Device

Next, an electronic device to which the vibration element 1 is applied will be described in detail with reference to FIGS. 12 to 14.

Figure 12:
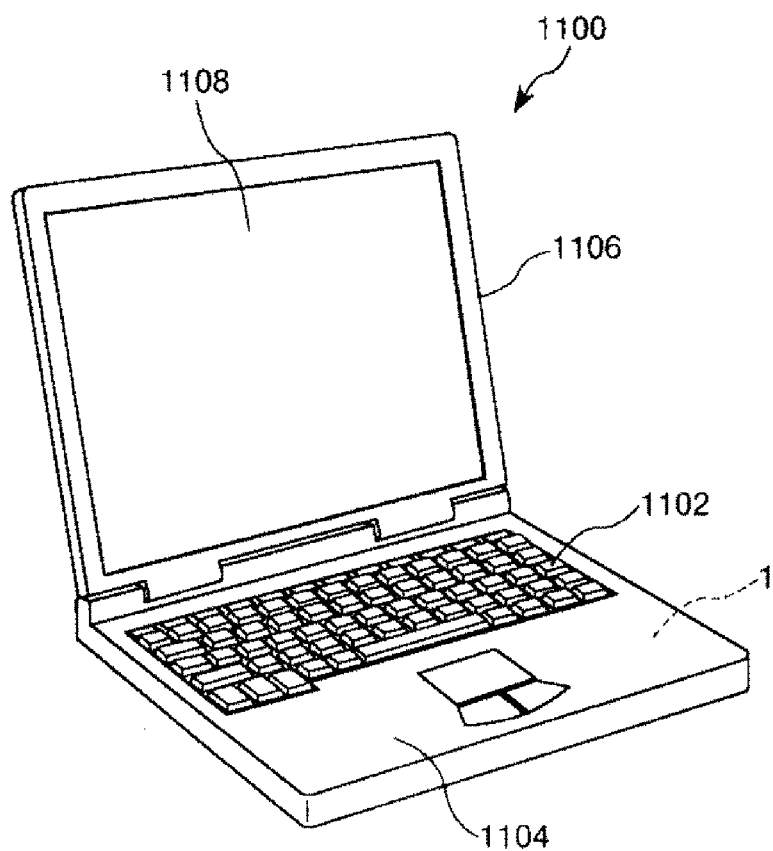
FIG. 12 is a perspective view illustrating a configuration of a mobile type (or note type) personal computer to which an electronic device including the vibration element according to the invention is applied.

FIG. 12 is a perspective view illustrating a configuration of a mobile type (or note type) personal computer to which an electronic device including the vibration element according to the invention is applied.

In this drawing, a personal computer 1100 is constituted by a main body 1104 including a keyboard 1102 and a display unit 1106 including a display portion 1108, and the display unit 1106 is rotatably supported with respect to the main body 1104 through a hinge structure. Such a personal computer 1100 has the built-in vibration element 1 functioning as an angular velocity detection unit (gyro sensor).

Figure 13:
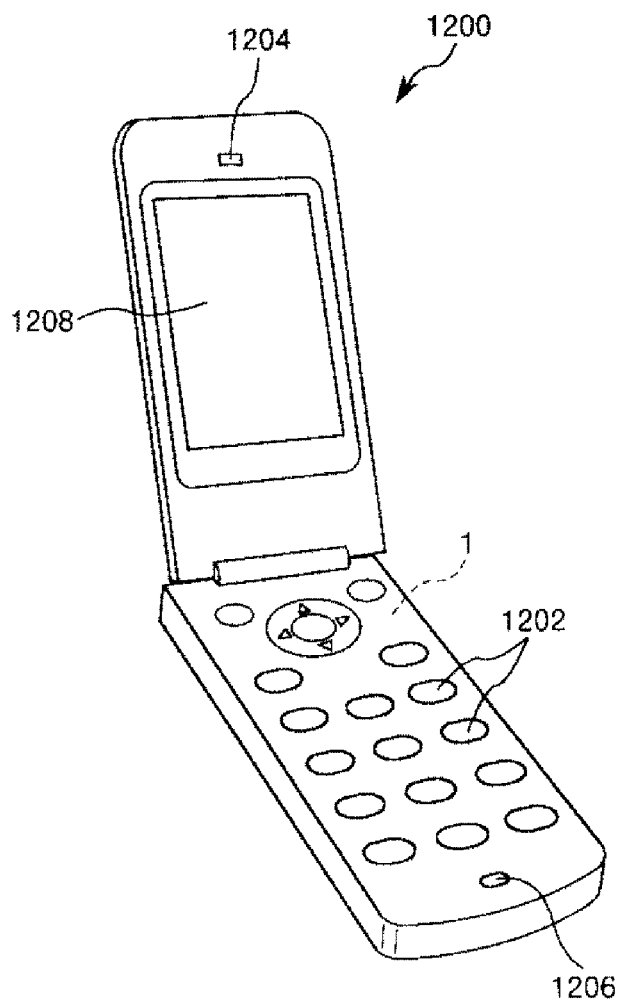
FIG. 13 is a perspective view illustrating a configuration of a cellular phone (also including PHS) to which an electronic device including the vibration element according to the invention is applied.

FIG. 13 is a perspective view illustrating a configuration of a cellular phone (also including PHS) to which an electronic device including the vibration element according to the invention is applied.

In this drawing, a cellular phone 1200 includes a plurality of operation buttons 1202, an ear piece 1204 and a mouth piece 1206, and a display portion 1208 is disposed between the operation buttons 1202 and the ear piece 1204. Such a cellular phone 1200 has the built-in vibration element 1 functioning as an angular velocity detection unit (gyro sensor).

Figure 14:
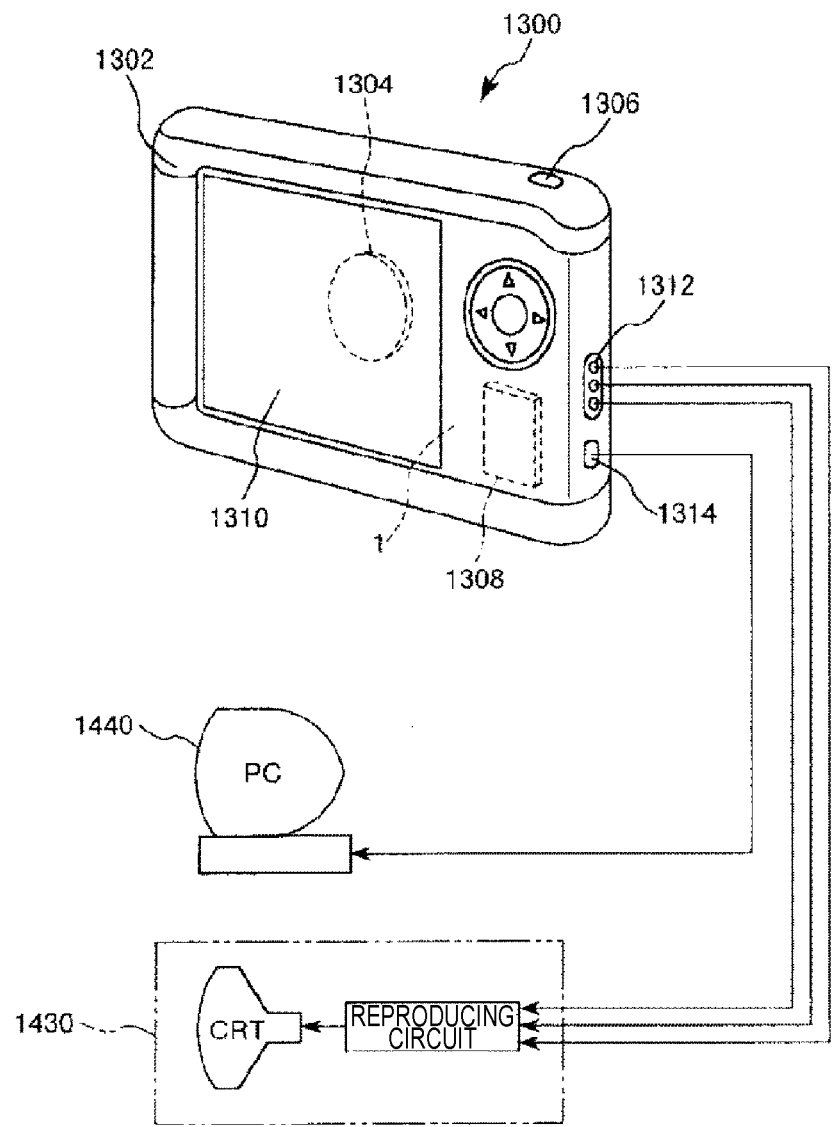
FIG. 14 is a perspective view illustrating a configuration of a digital still camera to which an electronic device including the vibration element according to the invention is applied.

FIG. 14 is a perspective view illustrating a configuration of a digital still camera to which the electronic device including the vibration element according to the invention is applied. Meanwhile, in the drawing, the connection with an external device is also shown simply. Here, a normal camera exposes a silver halide photo film through a light image of a subject, whereas a digital still camera 1300 generates an imaging signal (image signal) by photoelectrically converting a light image of a subject using an imaging device such as a CCD (Charge Coupled Device).

A display portion is provided on the rear of a case (body) 1302 in the digital still camera 1300, and is configured to perform a display on the basis of an imaging signal of a CCD. The display portion 1310 functions as a viewfinder for displaying a subject as an electronic image.

In addition, a light-receiving unit 1304 including an optical lens (imaging optical system), a CCD and the like is provided on the front side (back side in the drawing) of the case 1302.

When a photographer confirms a subject image displayed on the display portion and pushes a shutter button 1306, an imaging signal of the CCD at that point in time is transmitted and stored in and in a memory 1308.

In addition, in the digital still camera 1300, a video signal output terminal 1312 and an input and output terminal 1314 for data communication are provided on the lateral side of the case 1302.

As shown in the drawing, a TV monitor 1430 is connected to the video signal output terminal 1312 and a personal computer 1440 is connected to the input and output terminal 1314 for data communication, respectively as necessary. Further, the imaging signal stored in the memory 1308 is output to the TV monitor 1430 or the personal computer 1440 by a predetermined operation.

Such a digital still camera 1300 has the built-in vibration element 1 functioning as an angular velocity detection unit (gyro sensor).

Meanwhile, in addition to the personal computer (mobile type personal computer) of FIG. 12, the cellular phone of FIG. 13, and the digital still camera of FIG. 14, the electronic device including the vibration element according to the invention can be applied to, for example, an ink jet ejecting apparatus (for example, ink jet printer), a laptop personal computer, a television, a video camera, a video recorder, a car navigation device, a pager, an electronic notebook (also including a communication function), an electronic dictionary, an electronic calculator, an electronic game console, a word processor, a workstation, a TV phone, a security TV monitor, an electronic binoculars, a POS terminal, medical instrument (for example, electronic thermometer, sphygmomanometer, blood glucose monitoring system, electrocardiogram measurement device, ultrasound diagnostic device, and electronic endoscope), a fish finder, various types of measuring apparatus, meters and gauges (for example, meters and gauges of a vehicle, an aircraft, and a vessel), a flight simulator, and the like.

6. Moving Object

Next, a moving object to which the vibration element shown in FIG. 1 is applied will be described in detail with reference to FIG. 15.

Figure 15:
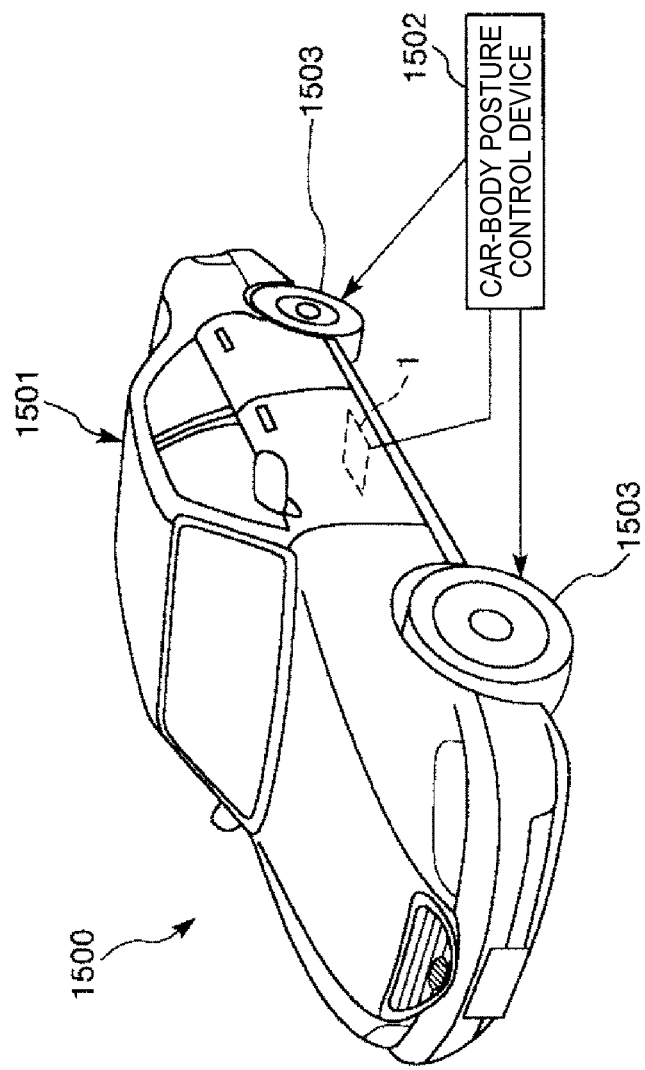
FIG. 15 is a perspective view illustrating a configuration of an automobile to which a moving object including the vibration element according to the invention is applied.

FIG. 15 is a perspective view illustrating a configuration of an automobile to which the moving object including the vibration element according to the invention is applied.

An automobile 1500 has the built-in vibration element 1 functioning as an angular velocity detection unit (gyro sensor), thereby allowing the posture of a car body 1501 to be detected by the vibration element 1. The detection signal of the vibration element 1 is supplied to a car-body posture control device 1502. The car-body posture control device 1502 detects the posture of the car body 1501 on the basis of the signal, and can control the hardness of a suspension depending on a detection result, or control the brakes of individual wheels 1503.

Besides, such posture control can be used in a bipedal walking robot or a radio control helicopter. As described above, the vibration element 1 is incorporated for the realization of the posture control of various moving objects.

As stated above, the vibration element, the vibrator, the electronic device and the moving object according to the invention have been described on the basis of the shown embodiments, but the invention is not limited thereto, and the configuration of each portion can be replaced by any configuration having the same function. In addition, any other configurations may be added to the invention. In addition, the invention may be configured such that any two or more configurations (features) in the above embodiments are combined.

In addition, in the aforementioned embodiment, a configuration in which the vibration element has four beams has been described, but the number of beams may be one to three and five or more, without being particularly limited. More specifically, for example, the second support portion and the second and fourth beams may be omitted, and the vibration element may be supported at one side by the first support portion and the first and third beams.

In addition, in the aforementioned embodiment, each beam is configured such that a total of four of the extending portions extending in the X-axis direction and the extending portions extending in the Y-axis direction are alternately connected to each other, but the configuration of the beam is not limited thereto. For example, the beam may be configured such that a total of six of the extending portions extending in the X-axis direction and the extending portions extending in the Y-axis direction are alternately connected to each other, and that a total of eight of them are alternately connected to each other.

In addition, in the aforementioned embodiment, the vibrating portion included in the vibration element includes the basal portion, the first and second detection arms, the first and second coupling arms, and the first to fourth drive arms, but the configuration of the vibrating portion is not limited thereto. For example, the vibrating portion may be configured to include the basal portion, a pair of drive arms, extending out in the +Y-axis direction from the basal portion, which are provided side by side in the X-axis direction, and a pair of detection arms, extending out in the −Y-axis direction from the basal portion, which are provided side by side by the X-axis direction. In this configuration, when an angular velocity around the Y-axis is applied in a state where a pair of drive arms are driven in a drive mode which is an X reverse-phase mode, vibration in a detection mode which is driven in a Z reverse-phase mode is excited in a pair of detection arms. In this case, an angular velocity around the Y-axis can be detected on the basis of a signal which is output from the detection arm.

The entire disclosure of Japanese Patent Application No. 2013-251780, filed Dec. 5, 2013 is expressly incorporated by reference herein.

What is claimed is:

1. A vibration element comprising:
    a vibrating member provided on a plane which is specified by a first axis and a second axis intersect with the first axis;
    a support member that supports the vibrating member; and
    a suspension arm that couples the vibrating member to the support member,
    wherein the suspension arm includes:
        a meandering portion member that extends from the support member and that alternately extends along the first axis and the second axis, and
        an inclination member that couples the meandering member to the vibrating member and that is inclined with respect to both the first axis and the second axis, and
    wherein the inclination member includes a plurality at portions having different angles with respect to the first axis.

2. The vibration element according to claim 1, wherein the vibrating member includes:
    a basal member;
    a support arm that outwardly extends from the basal member along the first axis;
    a drive arm that outwardly extends from a tip of the support arm, the drive arm extending along the second axis; and
    a detection arm that outwardly extends from the basal member along the second axis,
    wherein the suspension arm couples the basal member to the support member.

3. The vibration element according to claim 1, wherein respective lengths of the plurality of portions are substantially equal to each other.

4. The vibration element according to claim 1, wherein an end of the meandering member on a side of the inclination member extends along the first axis, and
    the plurality of portions includes:
        a first member, located on a side of the vibrating member, which has a first angle with respect to the first axis, and
        a second member, located on a side the meandering member, which has a second angle smaller than the first angle with respect to the first axis.

5. The vibration element according to claim 4, wherein the first angle is 50 to 70 degrees.

6. The vibration element according to claim 5, wherein the second angle is 20 to 40 degrees.

7. The vibration element according to claim 4, wherein the vibrating member, the support member and the suspension arm are obtained by processing one piezoelectric substrate, and
    a separation distance between the end of the meandering member and the support member is 0.8 times or more of a thickness of the piezoelectric substrate.

8. A vibrator comprising:
    the vibration element according to claim 1; and
    a package having the vibration element stored therein.

9. A vibration device comprising:
    the vibration element according to claim 1; and
    a circuit which is electrically connected to the vibration element.

10. An electronic device comprising the vibration element according to claim 1.

11. A moving object comprising the vibration element according to claim 1.

* * * * *